United States Patent [19]

Sedlacek et al.

[11] 4,371,115
[45] Feb. 1, 1983

[54] RING-GAP NOZZLE

[75] Inventors: Franz Sedlacek, Weingarten, Fed. Rep. of Germany; Jakob Oertle, Winterthur; Dietrich Cebulla, Lucerne, both of Switzerland

[73] Assignee: Escher Wyss Limited, Zurich, Switzerland

[21] Appl. No.: 13,918

[22] Filed: Feb. 22, 1979

[30] Foreign Application Priority Data

Mar. 1, 1978 [CH] Switzerland ............... 22017/82

[51] Int. Cl.³ .............................................. B05B 1/26
[52] U.S. Cl. ................................... 239/524; 34/57 A
[58] Field of Search ............... 239/591, 524, 518, 512, 239/505, 507, 514, 456; 34/57 R, 57 A, 57 B; 432/58, 14, 15; 23/313 FB

[56] References Cited

U.S. PATENT DOCUMENTS

| | | | |
|---|---|---|---|
| 1,133,711 | 3/1915 | Cornelius | 239/591 |
| 3,040,439 | 6/1962 | Frost | 34/57 A |
| 3,476,322 | 11/1969 | Dyck | 239/524 X |
| 3,495,336 | 2/1970 | Greewich et al. | 34/57 A |
| 3,635,407 | 1/1972 | Banks | 239/514 |
| 3,708,887 | 1/1973 | Erisman | 34/57 A |
| 3,737,105 | 6/1973 | Arnold et al. | 239/518 X |
| 4,062,656 | 12/1977 | Blaser et al. | 239/553.5 X |

FOREIGN PATENT DOCUMENTS 1106820  7/1955  France ........................... 239/524

Primary Examiner—John J. Love
Assistant Examiner—Gene A. Church
Attorney, Agent, or Firm—Robert A. Ostman

[57] ABSTRACT

Ring gap nozzle for distributing a fluid medium over a plate, comprising an axial channel passing through the plate, a cap which covers the channel, leaving a ring gap between it and the plate, and a connecting member extending coaxially through the channel for holding the cap in place. A wall which defines a rotationally symmetrical flow space extends from the connecting member to the outlet edge of the totally free ring gap. The annular flow space comprises a region of the channel, of a deflection space and of the ring gap. All the walls which bound it are arranged so that, starting at least in the deflection space, the flooded area of cross section of the annular flow space decreases continuously in the direction of the flow of medium towards the outlet edge of the ring gap.

9 Claims, 5 Drawing Figures

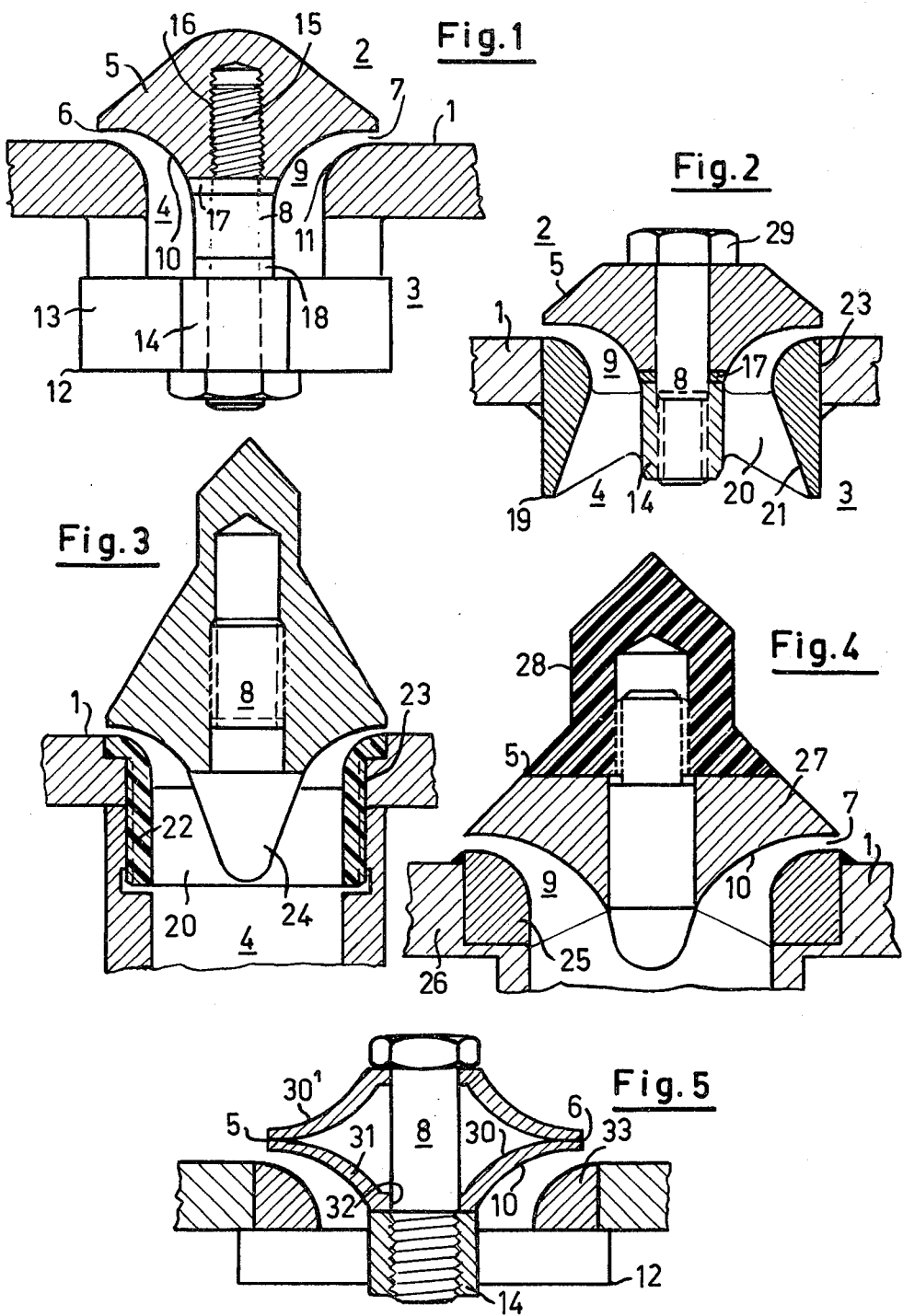

even number 4,371,115

RING-GAP NOZZLE

BACKGROUND OF THE INVENTION

The invention relates to a ring-gap nozzle for distributing a fluid medium over a plate, comprising an axial channel passing through the plate the said channel being covered by a cap so as to leave a ring gap between the cap and the plate, whilst the cap is held by means of a connecting member which passes coaxially through the channel and is attached to a clamp which is mounted at the start of the channel, in the direction of flow of the medium, thus forming an annular flow space, in which the medium flowing in the channel region axially is deflected in a deflection space and flows out radially through the ring gap.

Ring-gap nozzles of this kind are advantageously used in the bottom plate of a fluidised bed apparatus and serve to distribute the flowing medium which is to be used for fluidisation of the bed. The ring-gap nozzles are arranged on the surface of the plate at a spacing from one another and are intended to distribute and conduct the medium so as to form a cushion of medium along the surface to prevent the particles of product which are to be treated in the fluidised bed from coming into contact with the heated plate. This cushion thus prevents the product from being damaged or from burning or baking on to the surface of the bottom plate.

However, the ring-gap nozzles known hitherto do not always meet these requirements. Particularly in cases where the medium contains particles of solids, these particles may be deposited in the flow chamber of the nozzle as they pass through and thus from agglomerations on the walls which obstruct the flow of medium or, eventually, block the nozzle completely. The desired flow along the plate and the fluidisation of the bed alter and become inadequate in the course of time, and the entire fluidised bed apparatus has to be shut down in order to restore the nozzles to normal operation. In the case of aggressive or abrasive particles, the profiles of the nozzles which conduct the current of medium are also affected, and sometimes damaged to such an extent that the apparatus has to be put out of action to repair the nozzles. In a number of known cases, it has even been necessary to replace the entire bottom plate of the apparatus.

SUMMARY OF THE INVENTION

The aim of this invention is to provide a ring-gap nozzle wherein the above problems known to occur in previous nozzles are substantially eliminated. The service life of the nozzles and hence of the entire apparatus in which they are used should be lengthened. Any repairs needed on the nozzle should be easier to perform. Blockage of the nozzle and damage by agressive and/or abrasive particles should be substantially eliminated.

According to the invention, this aim is achieved in the ring gap nozzle of the type described at the beginning in that, from the connecting member to the outlet edge of a totally free ring gap, there extends a rotationally symmetrical wall which defines at least a portion of an annular, rotationally symmetrical flow space for guiding the medium, and that all the walls defining the flow space are so arranged that, starting at least in the deflection space of the flow space, the flooded area of the cross section of the annular flow space decreases continuously in the direction of flow of the medium towards the outlet edge of the ring gap.

In the ring gap nozzle according to the invention, the current of medium branches off in front of the totally free, rotationally symmetrical deflection space and flows, with continuous acceleration, through the flow space, which is adapted to the desired flow, as a current with no dead zones where the particles being carried along could be deposited. This configuration of the spaces also largely prevents erosion of the nozzle walls in the presence of abrasive or aggressive particles. The nozzle operates reliably and has a long service life.

BRIEF DESCRIPTION OF THE DRAWING

The object of the invention is hereinafter described in more detail with reference to some embodiments by way of example illustrated in the drawings.

In the drawings:

FIGS. 1 to 5 each show a schematic axial longitudinal section through an exemplary embodiment of a ring gap nozzle.

DESCRIPTION OF THE PREFERED EMBODIMENTS

The ring gap nozzle shown is arranged on the bottom plate 1 of a fluidised bed drier, for distributing a medium, e.g. hot air, containing particles of a substance such as fine sodium chloride crystals, into a fluidised bed 2. The fluidised bed apparatus is for example the second stage of a drying plant and is supplied with hot waste air containing dust particles exhausted from a first stage of the plant.

The medium flows out of a distributor box 3, under the plate 1, through a channel 4 which passes through the plate 1 perpendicularly thereto and into the fluidised bed 2. Above the channel 4 and at a spacing from the plate 1 there is fixed a cap 5, whilst between the plate 1 and the cap 5 there is an ring gap 7 through which the fluid medium is distributed radially outwards relative to the axis of the channel 4. The current axially flowing in the region of the channel 4 is deflected radially outwards in a deflection space 9.

The cap is held in position over the channel 4 solely by means of a connecting member 8 which is arranged coaxially with the cap 5 and is attached thereto and extends coaxially through the channel 4.

A rotationally symmetrical wall 10 extends from the connecting member 8 to an outlet edge 6 of the totally free ring gap 7. This wall, in turn, defines at least a portion of a rotationally symmetrical flow space which comprises successively the channel 4, the deflection space 9 and the annular gap 7. All the walls defining the flow space, i.e. the walls bounding the channel 4, the deflection space 9 and the ring gap 7, are arranged so that, starting at least in the deflection space 9, the flooded area of cross section of the annular flow space decreases continuously in the direction of flow of the medium towards the outlet edge 6 of the ring gap 7. Thus, as the distance between the centre line of the flow space and the axis thereof increases, the clear internal width of the flow space decreases so that the said area of cross section of the flow space becomes continuously smaller, thus constantly accelerating the flow of medium.

The rotationally symmetrical deflection space and the ring gap, which is totally free in all directions, thus do not present any obstacles whatsoever to the flow of medium. For this reason, a clamp 12, provided for the purpose of attaching the other end of the connecting member 8, is arranged in front of the deflection space, viewed in the direction of flow of the medium through the nozzle: In the exemplary embodiment according to FIG. 1, the clamp 12 is mounted below the channel 4 and plate 1, inside the distributor box 3 on the bottom plate 1, and comprises a U-shaped planar strip 13 welded on to the plate, symmetrically with respect to the channel 4. Coaxially with the axis of the channel 4, a boss 14 in which the lower end of the connecting member 8 is fixed is provided on the strip 13.

In order that the spacing between the walls defining at least the deflection space 9 and the ring gap 7 can be varied, the attachment of the connecting member 8 to the cap 5 or clamp 12 is effected as follows: as shown in the drawings, in FIG. 1 the connecting member 8 comprises, at its end which is attached to the cap 5, a thread 15 designed to engage in a corresponding thread 16 provided in the cap 5. In this way, the cap is screwed to the connecting member and the desired accurate positioning of the cap above the plate, and hence the desired gap width of the ring gap 7, can be adjusted. The selected position of the cap is then secured by means of an intermediate ring 17. Similarly, an intermediate ring 18 may be used on one side of a screw connection between the connecting member 8 and the clamp 12.

It would also be possible to construct the connecting member as a screw with threads at both ends, in which case the desired axial distance between the boss 14 and the cap 5, which would be screwed to the connecting member 8, could be fixed by means of a spacing sleeve. Another possible construction is shown in FIG. 2. Here, the connecting member 8 is a screw passing through the cap 5, comprising a head 29 for retaining the cap and having its other end screwed into the boss 14 of the clamp. The distance between the boss and the cap is determined by an intermediate ring 17.

In the exemplary embodiment according to FIG. 2, the entire channel 4 in the plate 1 is formed by a sleeve 19 which is fixed in a corresponding bore 23 provided in the plate 1 for this purpose. The sleeve 19, which forms the channel 4 leads into the distributor box 3 underneath and is welded to the plate from below. Two flaps 20 are provided in the channel 4, as clamping means for the connecting member 8. They extend along the axial plane of the nozzle, are arranged symmetrically therewith and comprise a boss 14 into which the connecting member 8 is screwed. The inner wall 21 of the channel 4 and the flaps 20 are designed in accordance with the required flow and contributed to the formation of an accelerated flow of medium in the channel 4, deflection space 9 and ring gap 7. The number of flaps retaining the boss 14 is not restricted to two. Depending on the required flow, a different number of flaps, e.g. three, may be justifiable or possibly desirable.

Another important feature of the example shown in FIG. 2 is that the entire apparatus, i.e. the ring gap nozzle, comprising the sleeve 19 which constitutes the channel, the clamp with the boss 14, the connecting member 8 and the cap 5, can be mass-produced and, in the case of damage or breakdown, all or part of the apparatus can easily be replaced. The mass-produced parts are interchangeable.

This also applies to the ring nozzle according to FIG. 3, wherein a sleeve 22 forms only part of a longer channel 4 projecting into the distributor box 3, and can be screwed into a corresponding bore 23 provided in the plate 1. In this embodiment, a boss 24 which retains the connecting member 8 is also advantageously formed to suit the desired accelerated flow, as shown in FIG. 3.

In the exemplary embodiment according to FIG. 4, some thought has been given to the fact that the particles carried by the medium may have an abrasive effect, leading to unavoidable erosive damage particularly to the walls which form the deflection space 9 and ring gap 7. The outer wall is formed by a sleeve 25 which constitutes part of the channel at its mouth and is fixed in a corresponding bore 26 in the plate 1. Because of the danger of erosive damage, this sleeve 25 is made from an erosion-proof material. If damage, e.g. erosion, does occur, this sleeve 25 can simply be replaced.

For the same reason, the wall 10 of the cap 5 defining the deflection space 9 and ring gap 7 is also made from an erosion-proof material, at least in parts, i.e. the parts where erosive damage could occur. The cap 5 is subdivided and comprises a rotationally symmetrical part 27 facing the plate 1; this part 27 defines the deflection space 9 and the ring gap 7 at least partially and is made from an erosion-proof material. The upper part 28 of this cap 5 is constructed so as to be capable of being screwed to the connecting member 8 and thus fixes the readily replaceable part 27 in position. Since the upper part 28 of the cap 5 is not exposed to any special thermal or mechanical stresses in most applications, it may be made from a non-metallic material, for example, as shown in FIG. 4.

A ring nozzle which is particularly advantageous from the point of view of production techniques is shown in FIG. 5. The wall 10 extending from the connecting member 8 to the outlet edge 6 of the ring gap is formed by a dish-shaped part 30 the outer wall of which has the form of the wall 10. The part 30 is advantageously a sheet metal cast part and comprises a wall 31 which is provided with a central opening 32 for the connecting member 8. If desired, two identical parts, one of which is designated 30 and other 30¹ in FIG. 5, may be assembled facing each other to form an upwardly convex cap 5. In the plate 1, the nozzle is formed with an annular part 33 inserted in the plate, whilst a clamp 12 (14) for the connecting member 8 is attached to said annular part 33.

We claim:

1. In a ring gap nozzle for distributing a fluid medium over a plate and comprising an axial channel through the plate; a cap covering the channel and spaced from the plate to define a ring gap having an exit which opens radially outward and is free of obstructions; means affixing the cap to the plate including a connecting member which is coaxial with the channel and holds the cap on a clamp member carried by the plate; and means defining an annular flow path through the nozzle including an axial portion in the channel through which said fluid medium enters the nozzle, a deflection portion in which fluid medium delivered through the axial portion is deflected and directed radially outward, and a rotationally symmetrical guiding portion which leads fluid medium from the deflection portion to the exit of the ring gap, the improvement wherein said annular flow path is bounded in part between curved, rotationally symmetrical walls, one of which is a wall of said cap; and wherein at least that part of the annular flow path including said deflection and guiding portions has a flow area which decreases continuously in the direction of flow of said medium.

2. A ring gap nozzle as defined in claim 1 in which said clamp member is located upstream of said channel.

3. A ring gap nozzle as defined in claim 1 in which at least the downstream end of said channel is formed by a sleeve which is fixed in a bore in said plate.

4. A ring gap nozzle as defined in claim 1 in which said channel is formed by a sleeve fixed in said plate; and said clamp member is mounted inside the sleeve and is located upstream of said deflection portion of the flow path.

5. A ring gap nozzle as defined in claim 1 in which said means affixing the cap to the plate includes means which establishes a predetermined axial spacing between said curved, rotationally symmetrical walls.

6. A ring gap nozzle as defined in claim 5 in which said connecting member includes a threaded portion which is screwed into a mating portion in the cap.

7. A ring gap nozzle as defined in either claim 5 or 6 in which the cap comprises two components, one of which is a replaceable, rotationally symmetrical part which faces said plate and defines said one curved, rotationally symmetrical wall.

8. A ring gap nozzle as defined in claim 1 in which the cap includes a dish-shaped part having an exposed surface which constitutes said one curved, rotationally symmetrical wall.

9. A ring gap nozzle as defined in claim 8 in which the cap is formed by two identical dish-shaped parts assembled in facing relationship so as to bound a closed space.

* * * * *